(12) United States Patent
Auer

(10) Patent No.: US 11,140,875 B2
(45) Date of Patent: *Oct. 12, 2021

(54) METHOD FOR LOCATING ANIMALS

(71) Applicant: SMARTBOW GMBH, Weibern (AT)

(72) Inventor: Wolfgang Auer, Weibern (AT)

(73) Assignee: SMARTBOW GMBH, Weibern (AT)

( * ) Notice: Subject to any disclaimer, the term of this patent is extended or adjusted under 35 U.S.C. 154(b) by 0 days.

This patent is subject to a terminal disclaimer.

(21) Appl. No.: 16/774,576

(22) Filed: Jan. 28, 2020

(65) Prior Publication Data

US 2020/0154680 A1   May 21, 2020

Related U.S. Application Data

(62) Division of application No. 15/117,541, filed as application No. PCT/AT2015/000022 on Feb. 12, 2015, now Pat. No. 10,568,303.

(30) Foreign Application Priority Data

Feb. 14, 2014   (AT) .................................. A 107/2014

(51) Int. Cl.
| | | |
|---|---|---|
| *A01K 29/00* | (2006.01) | |
| *A01K 11/00* | (2006.01) | |
| *G01S 5/04* | (2006.01) | |
| *G01S 5/12* | (2006.01) | |

(52) U.S. Cl.
CPC .......... *A01K 29/005* (2013.01); *A01K 11/004* (2013.01); *A01K 11/008* (2013.01); *G01S 5/04* (2013.01); *G01S 5/12* (2013.01)

(58) Field of Classification Search
CPC .. A01K 11/004; A01K 29/005; A01K 27/001; G01S 5/04; G01S 5/12; A63B 2220/12; A63B 2220/20; A61D 17/002; G06Q 10/08; G06Q 20/10; A61B 5/1118
See application file for complete search history.

(56) References Cited

U.S. PATENT DOCUMENTS

| | | |
|---|---|---|
| 3,999,611 A | 12/1976 | Bucalo |
| 6,122,960 A | 9/2000 | Hutchings et al. |
| 6,487,992 B1 * | 12/2002 | Hollis .................. A01K 15/021 119/712 |

(Continued)

FOREIGN PATENT DOCUMENTS

| | | |
|---|---|---|
| AT | 506628 A1 | 10/2009 |
| DE | 10045469 C2 | 12/2002 |

(Continued)

*Primary Examiner* — Mirza F Alam

(74) *Attorney, Agent, or Firm* — Harness, Dickey & Pierce, P.L.C.

(57) ABSTRACT

The invention relates to a method for automatically locating an animal by means of radio waves and a plurality of nodes, wherein the animal is located on a ground and is equipped with a node of the radio locating system to be located and with one or more acceleration sensors. By evaluating the measurement results of the acceleration sensors, a conclusion is drawn about which activity the animal is presently performing and at which height above the ground the node is located. The calculation of the position of the node to be located from the measurement results of the radio locating system is influenced by the assumption of said height as a constraint.

17 Claims, 2 Drawing Sheets

(56) References Cited

U.S. PATENT DOCUMENTS

Figure 1:
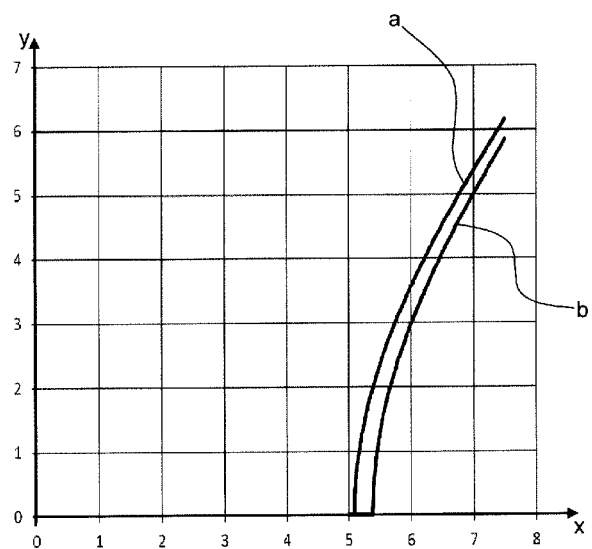

| | | | |
|---|---|---|---|
| 7,616,124 B2 | 11/2009 | Paessel et al. | |
| 2005/0145187 A1* | 7/2005 | Gray | A01K 11/008 119/174 |
| 2008/0190202 A1* | 8/2008 | Kulach | A63B 24/0062 73/514.01 |
| 2009/0009388 A1* | 1/2009 | Wangrud | A01K 11/008 342/357.55 |
| 2009/0211537 A1 | 8/2009 | Corke | |
| 2009/0211538 A1* | 8/2009 | Corke | A01K 29/005 119/720 |
| 2010/0238022 A1* | 9/2010 | Au | A01K 15/023 340/539.13 |
| 2011/0298619 A1* | 12/2011 | O'Hare | A01K 11/008 340/573.1 |
| 2013/0035110 A1* | 2/2013 | Sridhara | H04W 4/029 455/456.1 |

FOREIGN PATENT DOCUMENTS

| | | |
|---|---|---|
| EP | 549081 A1 | 6/1993 |
| EP | 1494397 A2 | 1/2005 |
| GB | 2234070 A | 1/1991 |
| GB | 2278198 A | 11/1994 |
| WO | 9941723 A1 | 8/1999 |
| WO | 2002091001 A1 | 11/2002 |
| WO | 2003055388 A2 | 7/2003 |
| WO | 2006077589 A2 | 7/2006 |
| WO | 2008113556 A1 | 9/2008 |
| WO | 2009135493 A1 | 11/2009 |
| WO | 2010066429 A1 | 6/2010 |
| WO | 2010108496 A1 | 9/2010 |
| WO | 2010109313 A1 | 9/2010 |
| WO | 2011153571 A2 | 12/2011 |
| WO | 2012079107 A2 | 6/2012 |

* cited by examiner

METHOD FOR LOCATING ANIMALS

The invention relates to a method for locating animals with the aid of radio waves.

Known systems for locating objects, for example animals, with the aid of radio waves have a plurality of radio transmitters and/or radio receivers at known positions and a respective radio transmitter and/or radio receiver on each object to be located.

Furthermore, the transmitters and receivers used for locating by means of radio waves are simply referred to as "nodes". According to a frequently used method, in order to determine the position of the node fitted to the animal to be located, radio signals are used in the first step to measure the length by which the distances between the individual nodes of known position and the node to be located differ from one another. For this purpose, a signal is simultaneously transmitted to all other nodes from the node to be located, for example. The receiving nodes measure the time at which this signal arrives at them. The differences between the individual measured times, each multiplied by the speed of light (signal propagation speed in the relevant medium), result in the differences in the distance between the individual nodes and the transmitting node. For the further calculation, it is assumed in the first step that the node to be located is on a hyperboloid, the axis of which runs through two nodes of known position as focal points, the measured difference in the distance between these nodes and the node to be located being equal to that length by which—by definition—the distances between the two focal points and each point on the hyperboloid differ. The possible position of the device to be located is restricted to two points as a result of at least three such hyperboloids intersecting. The further restriction to one point can be effected with the aid of a fourth hyperboloid (with the result that at least four nodes of known position are therefore required) or by virtue of one point being able to be excluded anyway on the basis of known geometrical circumstances, for example because said point is outside the shed inside which animals can move. (In this text, "hyperboloid" is used to mean a rotationally symmetrical shell-shaped area which can be considered to have been produced by rotation of a hyperbola around its main axis.)

If, in a modification of the method described, radio waves are used in the first step to directly infer the distances between the node on the animal to be located and the individual nodes of known position, spherical shells can be assumed in the second step instead of the hyperboloid shells.

In a simplifying further modification of the method described, radio waves are used to measure only a single distance, namely the distance between a single node of known position and the node to be located. The result is then precisely said distance between the two nodes or, if it is known that the node to be located may be only on a known line anyway on account of structural circumstances, the position which results from the line of intersection of the known line with that sphere whose radius is equal to the measured distance between the two nodes and whose center point is on the node of known position.

The documents AT 506628 A1, U.S. Pat. No. 6,122,960 A, DE 100 45 469 C2, WO9941723 A1, WO2011153571 A2 and WO2012079107 A2, for example, deal with the radio localization of animals according to the principles explained.

On account of considerable measurement errors and measurement inaccuracies which are often unavoidable in practice—for example on account of reflections of radio waves—it is necessary to introduce further logical assumptions and to carry out corresponding evaluations in order to be able to obtain a reasonably reliable location result. In addition to the already mentioned practice of excluding results which are impossible on account of geometrical circumstances, stochastic methods are used, in particular, to also restrict the ambiguity of the respective current result(s) on the basis of the results from preceding measurements and to find that measurement result which reflects reality with the lowest probability of errors. A proven stochastic model is the hidden Markov model in this context and, in particular, the Viterbi algorithm which can be used to find the currently most probable sequence of states in each case from a multiplicity of possible sequences of states in a relatively efficient manner. For example, EP 1 494 397 A2 describes such a method, in particular for use for radio localization in buildings, which is particularly difficult on account of repeatedly occurring signal reflections.

The documents EP 549081 A1, GB 2234070 A, GB 2278198 A, U.S. Pat. Nos. 3,999,611 A, 6,122,960 A, 7,616,124 B2, WO 2002091001 A1, WO 2003055388 A2, WO 2006077589 A2, WO 2010108496 A1 and WO 2010109313 A1, for example, propose and explain the practice of fitting acceleration sensors (inter alia) to live animals and using the measurement results from the acceleration sensors to infer the behavior of the animals which results in the respective accelerations. For this purpose, the measurement results are usually transmitted to a data processing system via a radio connection and are checked by said data processing system for matches with temporal profiles of acceleration data stored as patterns.

In this case, the temporal profiles stored as patterns are characteristic of particular activities of the animal, for example walking, eating, ruminating, sleeping, possibly walking with a limp, mounting other animals. In order to find the characteristic patterns, acceleration data and, in parallel therewith, the activities of animals determined on the basis of immediate observation were recorded in earlier work and correlations between acceleration patterns and activities were filtered from the recorded data.

It is also possible to already evaluate acceleration measurement data entirely or partially in a data processing system which is on that device which is on the animal and comprises the acceleration sensor(s).

WO9941723 A1 deals with a device which is carried by a person or an animal, can transmit and receive radio waves and the position of which can be determined by a satellite navigation system. It is also mentioned that, in addition to various other sensors which can measure a biological state, for example, the device can also have an acceleration sensor.

WO2011153571 A2 and WO2012079107 A2 deal with wireless ear tags for animals, an ear tag both enabling radio location and being able to contain an acceleration sensor which can be used to automatically identify activities of the animal by means of pattern evaluation.

U.S. Pat. No. 6,122,960 A deals predominantly with the measurement and recording of movements and distances covered by persons or animals by measuring accelerations and evaluating the measurements. It is additionally proposed to determine an "absolute position" by means of radio navigation.

On the basis of this prior art, the object of the invention is to provide a method for locating animals with the aid of radio waves, which method can be used and takes place automatically in exercise pens and enclosures for animals and provides more accurate and more reliable results in comparison with such known methods in terms of the investment costs required for this purpose.

In order to achieve the object, it is proposed to combine radio location and analysis of the data from at least one acceleration sensor in the following novel manner:

The data from the acceleration sensor are used to infer whether the relevant animal is in an upright (standing, walking or running) position or in a lying position. Depending on this decision, it is concluded how high a node, which is arranged on the animal and is used for radio location, is above the ground. The information relating to the height position of the node to be located can be included, as a boundary condition, in that calculation which is to be carried out during radio location and according to which the position of the node to be located is calculated from the results of one or more distance measurements or distance difference measurements between the node fitted to the animal and one or more nodes of known position.

Assuming the boundary condition that the node to be located is in a particular area already results in the calculation, which is required in radio location to find the coordinates of the location at which this node is situated, being highly simplified in comparison with a situation without such a boundary condition. A node of known position is less sufficient.

By virtue of the fact that, according to the results of the evaluation of the acceleration measurements, it is still possible to clearly stipulate in which of two different clearly defined areas the node to be located must lie, it is naturally possible to achieve considerably better accuracy than if, instead of this, only a mean "average area" were used and in this case it would not be known whether the node to be located is actually somewhat above or below this. Very important advantages of the method according to the invention result when shading objects such as walls or other animals are in the region in which the node to be located may be. In the method according to the invention, through the knowledge of the height at which the node to be located is situated, it is then possible to very correctly selectively state whether or not this node is shaded from direct visual contact with particular nodes of known position. It is therefore subsequently possible to very correctly selectively state whether or not the results from the respective node of known position can be concomitantly included in a calculation.

The invention is illustrated using outline sketches:

FIG. 1: shows, in a view from above, lines of intersection of a hyperboloid, the axis of which runs parallel to the X axis, with two planes which are parallel to the xy plane at different heights.

Figure 2:
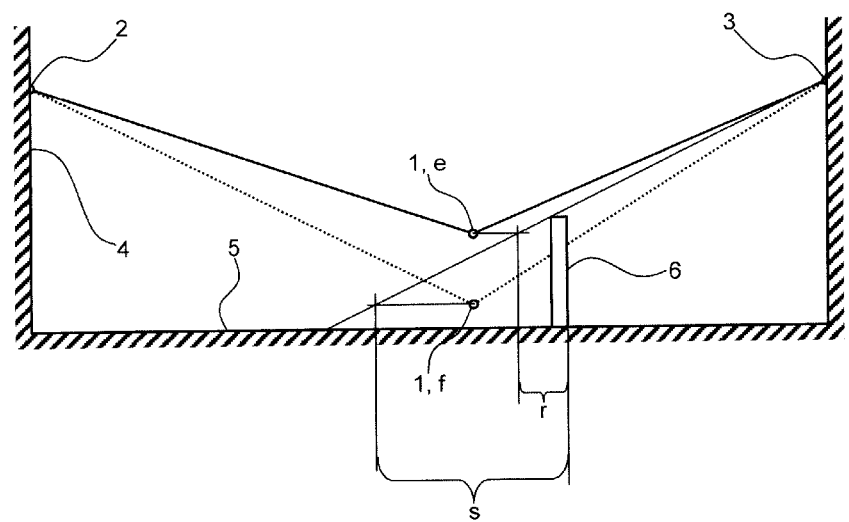

FIG. 2: shows a side view of geometrical relationships in an exemplary space in which the invention is used.

The curves a, b from FIG. 1 are each a section of a line of intersection of a single hyperboloid with two different planes parallel to the xy plane. Assuming that the unit of length is a meter, the focal points of the hyperboloid are 15 meters away from one another, on a straight line parallel to the x axis, with the x coordinates of −7.5 and +7.5, and the difference in the distances of the two focal points with respect to each point of the hyperboloid is 10 meters. The sectional plane which leads to the curve a is one meter below the connecting line between the focal points. The sectional plane which leads to the curve b is 2.2 meters below the connecting line between the focal points.

The curves a, b therefore reflect the ideal conditions if
a node of a radio location system is respectively fitted to
walls which are 15 meters away from one another at a height of 2.5 meters in a shed, and
if there are cattle in the shed, in the case of which the node to be located is an ear tag and is at a height of 1.5 meters if a cow is standing or walking and is at a height of 0.3 meters if the cow has lain down or is eating from the ground, and
if the distance between the ear tag of a cow and the one node is 10 meters greater than the distance from the other node, and
if the radio location principle used is one in which the differences between the signal propagation times between the node to be located and the various nodes of known position are measured.

With respect to the xy coordinates, the normal distance between the two sectional curves a, b is only approximately ⅓ meter and is therefore not significant at first glance. However, it is seen that, in the normal to the connecting line between the focal points of the hyperboloid, that is to say in the normal to the connecting line between the two nodes of known position, the distance between the two curves a, b can be approximately two meters if the node to be located is in the vicinity of the connecting line between the nodes of known position.

The use according to the invention of one particular curve of two different curves a, b instead of a single "average curve" (which could be assumed to be in the middle between the curves a, b) therefore drastically improves the measurement accuracy with respect to the y coordinate, while the improvement in the measurement accuracy with respect to the x coordinate (which is parallel to the connecting line between the nodes of known position) is only minor.

The perhaps most important advantage of the method according to the invention is explained using FIG. 2.

Animals which have nodes 1 to be located, typically in the form of an ear tag, are in a compound, for example an exercise pen, which is defined by side walls 4 and the ground 5. Nodes 2, 3 of a radio location system are anchored at a known position on the side walls. An object 6 which shades some volume areas r, s above the ground 5 of the compound with respect to the node 3 is situated in the compound, with the result that there is no direct visual contact with the node 3 from these volume areas. The shading object may be, for example, a separating wall, a feeding device or else another animal, the position of which has been determined by means of radio location.

As is known per se, it is taken into account, when logically evaluating the results of the radio location which are ambiguous per se, whether or not the node 1 to be located can actually be situated at a location apparently resulting from the calculation. Furthermore, if the required basic information is available, calculation results, in which measurement results from the node 3 have been concomitantly included, are excluded as invalid if they state that the node 1 to be located is in a volume area s from which there is no direct visual contact at all with the node 3 of known position. This is because the measured signal propagation time on which the calculation is based then cannot reflect the distance between the nodes 1 and 3 on a direct elongated line.

By virtue of the fact that the height at which the node 1 to be located must be situated is already assumed, according to the invention, as a boundary condition for calculating the position, considerably different volume areas s, r, which are shaded from the node 3 by the object 6, result for the calculation depending on the situation (smaller or larger of the two possible heights).

If a calculation using the radio location results reveals that the node 1 to be located is in a volume area s, r shaded with respect to a node 3 and if measured values from the node 3 are concomitantly included in this calculation, the relevant calculation result can be classified as invalid, that is to say cannot be considered any further, for the further evaluation.

In the example illustrated in FIG. 2, the calculation result which concomitantly includes the node 3 can therefore be handled further as a possible result if it is known, on the basis of the evaluation of the results from the acceleration measurements, that the node 1 to be located must be at the higher position, thus resulting in the point e as its calculated whereabouts. In contrast, a calculation result which concomitantly includes the measurement result from the node 3 can be classified as certainly invalid with respect to the further evaluation if it is known, on the basis of the evaluation of the results from the acceleration measurements, that the node 1 to be located must be at the lower position, thus resulting in point f as its calculated whereabouts since the point f is in the volume area s shaded from the node 3 by the object 6.

The method according to the invention can be used for a wide variety of animals. In practice, uses on cattle and pigs are probably the most significant. For each type of animal and possibly also individually for each individual animal, it is necessary to check and stipulate for the calculations at which height above the ground the node arranged on the animal is most likely to be during which activities of the animal. If more than two different activities of the animal can be identified during the acceleration evaluation, more than two possible heights may also be defined under certain circumstances, in which case a different height is respectively assigned to a different activity (standing, "sitting", lying, lying with the head raised, lying with the head on the ground etc.). The one correct height in each case can then be selected from more than two possible heights as the boundary condition for calculating the position from the radio location.

Particularly simple calculations result if the ground 5 is a flat surface and if all nodes 2, 3 of known position are arranged at the same height above the ground 5.

The invention claimed is:

1. A radio location apparatus for locating an animal, the apparatus comprising:
   a data processing system including a processor and memory, the data processing system configured to
   control a first fixed node at a first fixed position to transmit a first radio signal to a mobile node attached to the animal and receive a first response signal from the mobile node, the first response signal including an acceleration measurement from a sensor on the animal,
   determine a height of the mobile node based on the acceleration measurement,
   determine a distance between the first fixed node and the mobile node based on the first radio signal and the first response signal, and
   determine whether the mobile node is in a direct line of sight of the first fixed node based on the first radio signal and the first response signal, wherein
   in response to determining the mobile node is in the direct line of sight of the first fixed node, the data processing system is further configured to
      determine a plurality of possible positions of the mobile node in the direct line of sight of the first fixed node based on the distance between the first fixed node and mobile node,
      eliminate positions from the plurality of possible positions in the direct line of sight of the first fixed node based on the direct line of sight determination and the height of the mobile node, and
      determine an actual position of the mobile node from remaining positions of the plurality of possible positions in the direct line of sight of the first fixed node, and
   in response to determining the mobile node is not in the direct line of sight of the first fixed node,
      determine a plurality of possible positions of the mobile node outside the direct line of sight of the first fixed node,
      eliminate positions from the plurality of possible positions outside the direct line of sight of the first fixed node based on the height of the mobile node, and
      determine a position of the mobile node outside the direct line of sight of the first fixed node from remaining possible positions outside the direct line of sight of the first fixed node based on the height of the mobile node.

2. The radio location apparatus of claim 1, wherein the data processing system is further configured to
   control a second fixed node at a second fixed position to transmit a second radio signal to the mobile node and receive a second response signal from the mobile node,
   determine a distance between the second fixed node and the mobile node, and
   determine the plurality of possible positions of the mobile node based on the distance between the first fixed node and the mobile node, and the distance between the second fixed node and the mobile node.

3. The radio location apparatus of claim 2, wherein the first fixed node and the second fixed node are configured to be installed at the respective first and second fixed positions at a same height relative to each other.

4. The radio location apparatus of claim 1, wherein the data processing system is further configured to eliminate the positions from the plurality of positions in the direct line of sight of the first fixed node and the positions from the plurality of positions outside the direct line of sight of the first fixed node in response to the mobile node not being in the direct line of sight of the first fixed node and the height of the mobile node being above a predetermined height stored in memory.

5. The radio location apparatus of claim 1, wherein the first fixed node is a transceiver.

6. The radio location apparatus of claim 1, wherein the mobile node is a transponder tag.

7. The radio location apparatus of claim 1, wherein the sensor is an accelerometer.

8. The radio location apparatus of claim 1, wherein
   the data processing system is further configured to determine an activity of the animal based on the acceleration measurement by comparing the acceleration measurement to predetermined activities and corresponding acceleration measurements stored in memory, and wherein
   the data processing system is further configured to determine the height of the mobile node based on the activity of the animal.

9. The radio location apparatus of claim 1, wherein
   the activity is one of standing, sitting, lying with head raised, and lying with head on ground.

10. A radio location system for locating an animal, the system comprising:
    one or more fixed nodes configured to respectively transmit a radio signal and receive corresponding response signals, the one or more fixed nodes further configured to be installed at fixed positions;

a mobile node configured to receive the respective radio signals from each of the one or more fixed nodes and to transmit the corresponding response signals to each of the one or more fixed nodes, the mobile node further configured to attach to the animal;

a sensor configured to take an acceleration measurement and include the acceleration measurement in the corresponding response signals, the sensor further configured to attach to the animal and to connect to the mobile node;

a data processing system including a memory and a processor, the data processing system configured to control the one or more fixed nodes to transmit the respective radio signals to the mobile node and receive the corresponding response signals from the mobile nodes, determine a height of the mobile node based on the acceleration measurement, determine a respective distance between each of the one or more fixed nodes and the mobile node based on the respective radio signals from each of the one or more fixed nodes and the corresponding response signals, and respectively determine for each of the one or more fixed nodes, whether the mobile node is in a direct line of sight of each of the one or more fixed nodes based on the respective radio signals from each of the one or more fixed nodes and the corresponding response signals, wherein in response to determining the mobile node is in the direct line of sight of the one or more fixed nodes, the data processing system is further configured to determine a plurality of possible positions of the mobile node in the direct line of sight of the one or more fixed nodes based on the respective distances between the one or more fixed nodes and the mobile node, eliminate positions from the plurality of possible positions in the direct line of sight of the one or more fixed nodes based on the respective direct line of sight determinations and the height of the mobile node, and determine an actual position of the mobile node from remaining positions of the plurality of possible positions within the direct line of sight of the first fixed node, and in response to determining the mobile is not in the direct line of sight of the one or more fixed nodes, the data processing system is further configured to determine a plurality of possible positions outside the direct line of sight of the one or more fixed nodes, eliminate positions from the plurality of possible positions outside the direct line of sight of the one or more fixed nodes based on the height of the mobile node, and determine a position of the mobile node outside the direct line of sight of the one or more fixed nodes from remaining possible positions outside the direct line of sight of the one or more fixed nodes based on the height of the mobile node.

11. The radio location system of claim 10, wherein
the one or more fixed nodes are further configured to be installed at a same height relative to each other.

12. The radio location system of claim 10, wherein the data processing system is further configured to eliminate the positions from the plurality of positions in the direct line of sight of the one or more fixed nodes and outside the direct line of sight of the one or more fixed nodes in response to the mobile node not being in the direct lines of sight of the one or more fixed nodes and the height of the mobile node being above a predetermined height stored in memory.

13. The radio location system of claim 10, wherein the one or more fixed nodes are transceivers.

14. The radio location system of claim 10, wherein the mobile node is a transponder tag.

15. The radio location system of claim 10, wherein the sensor is an accelerometer.

16. The radio location system of claim 10, wherein
the data processing system is further configured to determine an activity of the animal based on the acceleration measurement by comparing the acceleration measurement to predetermined activities and corresponding acceleration measurements stored in memory, and wherein
the data processing system is further configured to determine the height of the mobile node based on the activity of the animal.

17. The radio location system of claim 16, wherein
the activity is one of standing, sitting, lying with head raised, and lying with head on ground.

* * * * *